United States Patent
Rodman et al.

(10) Patent No.: US 7,821,918 B2
(45) Date of Patent: *Oct. 26, 2010

(54) SYSTEM AND METHOD FOR COMMUNICATION CHANNEL AND DEVICE CONTROL VIA AN EXISTING AUDIO CHANNEL

(75) Inventors: Jeffrey Rodman, San Francisco, CA (US); David Drell, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 1027 days.

This patent is subject to a terminal disclaimer.

(21) Appl. No.: 10/378,711

(22) Filed: Mar. 3, 2003

(65) Prior Publication Data

US 2004/0022272 A1    Feb. 5, 2004

Related U.S. Application Data

(63) Continuation-in-part of application No. 10/335,108, filed on Dec. 31, 2002.

(60) Provisional application No. 60/360,984, filed on Mar. 1, 2002.

(51) Int. Cl.
*H04J 7/00*    (2006.01)

(52) U.S. Cl. .................. 370/212; 370/261; 370/494

(58) Field of Classification Search ............. 370/202, 370/204–205, 212–213, 260–261, 412–418, 370/443, 468, 494; 348/14.01, 14.09, 14.1, 348/14.11–14.13
See application file for complete search history.

(56) References Cited

U.S. PATENT DOCUMENTS

| 3,573,377 A | 4/1971 | Anderson |
| 3,612,767 A | 10/1971 | Anderson |
| 3,649,761 A | 3/1972 | Bush |
| 3,927,269 A | 12/1975 | Yoshino et al. |
| 4,058,769 A | 11/1977 | Alderman |
| 4,257,119 A | 3/1981 | Pitrods |
| 4,311,877 A | 1/1982 | Kahn |
| 4,351,062 A | 9/1982 | Yoshiya |

(Continued)

FOREIGN PATENT DOCUMENTS

| EP | 0 669 749 | 8/1995 |
| EP | 0 669 749 A | 8/1995 |
| EP | 0 699 749 A1 | 8/1995 |
| EP | 0 680 190 | 11/1995 |
| EP | 1 006 706 | 7/2003 |

(Continued)

OTHER PUBLICATIONS

P. Mermelstein, "*XP-001025802 G722, a New CCITT Coding Standard for Digital Transmission of Wideband Audio Signals*;" IEEE Communications Magazine; Jan. 1988—vol. 26, No. 1 pp. 8-15.

(Continued)

*Primary Examiner*—Ricky Ngo
*Assistant Examiner*—Phuongchau B Nguyen
(74) *Attorney, Agent, or Firm*—Wong, Cabello, Lutsch, Rutherford & Brucculeri, LLP (57) ABSTRACT

A system and method for communication channel and device control via an existing audio channel. A combined communication signal is received from a communication device comprising an audio signal and a modulated carrier signal via an audio channel. The audio signal is separated from the carrier signal. Digital data is extracted from the carrier signal. Device control is performed utilizing the extracted digital data.

41 Claims, 6 Drawing Sheets

U.S. PATENT DOCUMENTS

| | | | |
|---|---|---|---|
| 4,384,362 A | 5/1983 | Leland | |
| 4,425,642 A | 1/1984 | Moses et al. | |
| 4,544,804 A | 10/1985 | Herr et al. | |
| 4,763,317 A | 8/1988 | Lehman | |
| 4,782,521 A | 11/1988 | Bartlett | |
| 4,796,293 A | 1/1989 | Blinken et al. | |
| 4,945,412 A | 7/1990 | Kramer | |
| 4,995,071 A | 2/1991 | Weber et al. | |
| 5,003,593 A | 3/1991 | Mihm, Jr. | |
| 5,473,631 A | 12/1995 | Moses | |
| 5,526,354 A | 6/1996 | Barraclough et al. | |
| 5,530,699 A | 6/1996 | Kline | |
| 5,572,247 A | 11/1996 | Montgomery et al. | |
| 5,625,407 A | 4/1997 | Biggs et al. | |
| 5,677,728 A | 10/1997 | Schoolman | |
| 5,687,095 A | 11/1997 | Haskell et al. | |
| 5,758,079 A | 5/1998 | Ludwig | |
| 5,835,129 A | 11/1998 | Kumar | |
| 5,841,763 A | 11/1998 | Leondires et al. | |
| 5,886,734 A | 3/1999 | Ozone et al. | |
| 5,894,321 A | 4/1999 | Downs et al. | |
| 5,914,940 A | 6/1999 | Fukuoka et al. | |
| 5,916,302 A | 6/1999 | Dunn et al. | |
| 5,983,192 A | 11/1999 | Botzko et al. | |
| 5,983,261 A | 11/1999 | Riddle | |
| 5,991,385 A | 11/1999 | Dunn et al. | |
| 5,999,207 A | 12/1999 | Rodrigues et al. | |
| 5,999,966 A | 12/1999 | McDougall et al. | |
| 6,049,531 A | 4/2000 | Roy | |
| 6,088,368 A | 7/2000 | Rubinstain | |
| 6,111,936 A | 8/2000 | Bremer | |
| 6,130,880 A | 10/2000 | Naudus | |
| 6,134,223 A | 10/2000 | Burke et al. | |
| 6,154,524 A | 11/2000 | Bremer | |
| 6,170,011 B1 | 1/2001 | Macleod Beck et al. | |
| 6,178,237 B1 | 1/2001 | Horn | |
| 6,185,285 B1 | 2/2001 | Relyea et al. | |
| 6,192,395 B1 | 2/2001 | Lerner | |
| 6,202,084 B1 | 3/2001 | Kumar et al. | |
| 6,208,372 B1 | 3/2001 | Barraclough | |
| 6,230,197 B1 | 5/2001 | Beck et al. | |
| 6,272,176 B1 | 8/2001 | Srinivasan | |
| 6,327,567 B1 | 12/2001 | Willehadson et al. | |
| 6,345,047 B1 | 2/2002 | Regnier | |
| 6,421,355 B1 | 7/2002 | Quiring | |
| 6,453,022 B1 | 9/2002 | Weinman, Jr. | |
| 6,453,336 B1 | 9/2002 | Beyda et al. | |
| 6,501,739 B1 | 12/2002 | Cohen | |
| 6,501,740 B1 | 12/2002 | Sun et al. | |
| 6,580,789 B1 | 6/2003 | Simpson et al. | |
| 6,584,138 B1 | 6/2003 | Neubauer et al. | |
| 6,628,644 B1 | 9/2003 | Nelson et al. | |
| 6,631,165 B1 * | 10/2003 | Lambert et al. | 370/205 |
| 6,671,263 B1 | 12/2003 | Potter et al. | |
| 6,728,367 B1 | 4/2004 | Swam | |
| 6,731,609 B1 | 5/2004 | Hirni et al. | |
| 6,792,092 B1 | 9/2004 | Michalewicz | |
| 6,798,753 B1 | 9/2004 | Doganata et al. | |
| 6,812,955 B2 | 11/2004 | Takaki et al. | |
| 6,888,935 B1 | 5/2005 | Day | |
| 6,898,620 B1 | 5/2005 | Ludwig et al. | |
| 6,940,826 B1 | 9/2005 | Simard et al. | |
| 7,006,456 B2 | 2/2006 | Rabipour et al. | |
| 7,006,616 B1 | 2/2006 | Christofferson et al. | |
| 7,050,452 B2 * | 5/2006 | Sugar et al. | 370/208 |
| 7,107,312 B2 | 9/2006 | Hackbarth et al. | |
| 7,185,054 B1 | 2/2007 | Ludwig et al. | |
| 7,302,050 B1 | 11/2007 | Michaelewicz | |
| 7,428,223 B2 | 9/2008 | Nierhaus et al. | |
| 7,526,078 B2 * | 4/2009 | Rodman et al. | 370/260 |
| 2001/0008556 A1 | 7/2001 | Bauer | |
| 2001/0016038 A1 | 8/2001 | Sammon et al. | |
| 2001/0033613 A1 | 10/2001 | Vitenberg | |
| 2001/0043571 A1 | 11/2001 | Jang et al. | |
| 2002/0034166 A1 | 3/2002 | Barany et al. | |
| 2002/0083462 A1 | 6/2002 | Arnott | |
| 2002/0093985 A1 | 7/2002 | Nimmagadda | |
| 2002/0097679 A1 | 7/2002 | Berenbaum | |
| 2002/0122429 A1 | 9/2002 | Griggs | |
| 2002/0131377 A1 | 9/2002 | DeJaco et al. | |
| 2002/0151294 A1 | 10/2002 | Kirby et al. | |
| 2003/0016676 A1 | 1/2003 | Allen et al. | |
| 2003/0048353 A1 | 3/2003 | Kenoyer et al. | |
| 2003/0053443 A1 | 3/2003 | Owens | |
| 2003/0112947 A1 | 6/2003 | Cohen | |
| 2003/0123645 A1 | 7/2003 | Comisky | |
| 2003/0179859 A1 | 9/2003 | Chea et al. | |
| 2004/0003045 A1 | 1/2004 | Tucker et al. | |
| 2004/0012669 A1 | 1/2004 | Drell et al. | |
| 2004/0125932 A1 | 7/2004 | Orbach et al. | |
| 2006/0098692 A1 | 5/2006 | D'Angelo | |
| 2006/0222155 A1 | 10/2006 | Summers et al. | |

FOREIGN PATENT DOCUMENTS

| | | | |
|---|---|---|---|
| JP | 05300509 | | 12/1993 |
| JP | 08125738 | | 5/1996 |
| JP | 10042264 | | 2/1998 |
| RU | 2 096 921 | | 11/1997 |
| WO | 94/18779 | | 8/1994 |
| WO | 98/19458 | | 5/1998 |
| WO | WO 98/19458 | * | 5/1998 |
| WO | 99/12351 | | 3/1999 |

OTHER PUBLICATIONS

Schulzrinne, Voice Communication Across the Internet: A Network Voice Terminal, 1992, pp. 1-34, Amherst, MA.

Haojun, Implementing an Audio Multipoint Processor on DSP Array, 2001, pp. 441-444.

Jung, The Multimedia Desktop Conference System Adaptability in Network Traffic on LAN, 1995, pp. 334-338, IEEE.

Noore, Computer-Based Multimedia Video Conferencing System, 1993, pp. 587-591.

Sasse, Workstation-based Multimedia Conferencing: Experiences from the MICE Project, 1994, pp. 1-6.

International Search Report received in corresponding International Application No. PCT/US02/41778 dated Jul. 17, 2003.

Search Report received in corresponding European Application No. 03743750.6-2414- PCT/US0306698 dated Mar. 16, 2005.

Search Report received in corresponding European Application No. 03726026.2-2414-US0306736 dated Mar. 10, 2005.

International Search Report received in corresponding International Application No. PCT/US01/51636 dated Sep. 26, 2002.

Hoajun et al.; "Implementing An Audio Multipoint Processor on DSP Array;" IEEE May 2001; pp. 441-444.

Jung et al.; "The Multimedia Desktop conference System Adaptability in Network Traffic on LAN;" IEEE 1995; pp. 334-338.

Noore et al.; "Computer-Based Multimedia Video Conference System;" IEEE 1993; pp. 587-592.

Sasse et al.; "Workstation-Based Multimedia Conferencing: Experiences from the MICE Project;" IEEE 1994; pp. 1-6

Mermelstein P.; "G.722, A New CCITT CCITT Coding Standard for Digital Transmission of Wideband Audio Signals;" IEEE Communications Magazine; 26(1) Jan. 1988; pp. 8-15.

International Search Report received in corresponding International Application No. PCT/US01/51636 dated Sep. 26, 2001.

Mermeistein P.; "G.722, A New CCITT Coding Standard for Digital Transmission of Wideband Audio Signals;" IEEE Communications Magazine; 26(1) Jan. 1988; pp. 8-15.

Mermeistein; "G.722, A New CCIT Coding Standard for Digital Transmission of Wideband Audio Signals;" IEEE Communications Magazine; Jan. 1988—vol. 26, No. 1.

Schulzrinne; "Voice Communication Across the Internet: A Network Voice Terminal;" 1992, pp. 1-34, Amherst, MA.

Haojun; "Implementing an Audio Multipoint Processor on DSP Array;" 2001, pp. 441-444.

Jung; "The Multimedia Desktop Conference System Adaptability in Network Traffic on LAN;" 1995; pp. 334-338, IEEE.

Noore; "Computer-Based Multimedia Video Conferencing System;" 1993; pp. 587-591.

Sasse; "Workstation-Based Multimedia Conferencing: Experiences from the MICE Project;" 1994; pp. 1-6.

User's Guide Adminstrator's guide, SoundStation(R) VTX 1000 Operation Manual, (c)2003 Polycom, Inc.

Quick Installation Guide, Vortex(R)—Soundstation VTX 1000TM, (c)2004, Polycom, Inc..

J. Rodman, Polycom(R), White Paper—"The Power of Shared Resources: Conference Room Integration in the VTX/VSX Environment" Jun. 2, 2004, pp. 1-6.

J. Rodman, Polycom(R), White Paper—"The Distributed Dawn: the Emergence of Versatile Performance in the Conferencing Environment" Jun. 2, 2004, pp. 1-7.

H324 Videophones Standard; http://www.elextronika.com/tvphone/h324.htm; Retrieved Mar. 14, 2005; 4 pages.

International Telecommunication Union; ITU-T Telecommunication Standardization Sector of ITU H.234 (Mar. 2002) Series H: Audiovisual and Multimedia Systems Infrastructure of Audiovisual services—Systems and terminal equipment for audiovisual services Terminal for low bit-rate multimedia Communication; ITU-T Recommendation H.324.

MultiTech(R) Systems; MultiModernDSVD Compact DSVD Modems; http://www.multitech.com/Products/Families/MultiModernDSVD; obtained Mar. 14, 2005.

DSVD and H324 Standards; TechOnLine—Modern and Fax Standards and Software; http://www.techonline.com/community/ed_resource/feature_article/20041; Obtained Mar. 24, 2005.

Hering, et al.; "Safety and Security Increases for Air Traffic Management Through Unnoticeable Watermark Aircraft Identification Tag Transmitted with VHF Voice Communication" pp. 1-10; © 2003 IEEE.

CDMA Overview, Resources/Tutorials; http://www.telecomspace.com/cdma.html; Retrieved Sep. 24, 2006; 5 pages.

Spread spectrum—Wikipedia, the free encyclopedia; http://en.wikipedia.org/wiki/Spread_spectrum; retrieved Sep. 24, 2006; 4 pages.

Search Report received in corresponding European Application No. EP 02 72 8007 dated Sep. 26, 2006.

Office Action dated Jul. 24, 2007, in related case, U.S. Appl. No. 10/378,709, filed Mar. 3, 2003.

Amendment dated Nov. 15, 2007, in related case, U.S. Appl. No. 10/378,709, filed Mar. 3, 2003.

* cited by examiner

SYSTEM AND METHOD FOR COMMUNICATION CHANNEL AND DEVICE CONTROL VIA AN EXISTING AUDIO CHANNEL

CROSS-REFERENCES TO RELATED APPLICATIONS

The present application claims priority from Provisional Patent Application Ser. No. 60/360,984, filed Mar. 1, 2002, which is incorporated herein by reference in its entirety. The present application is also a continuation in part of patent application Ser. No. 10/335,108, entitled Method and Apparatus for Wideband Conferencing, filed Dec. 31, 2002.

BACKGROUND OF THE INVENTION

1. Field of the Invention

The present invention relates generally to the field of teleconferencing, and more particularly to a system and method for communication channel and device control via an existing audio channel.

2. Background of the Invention

The telecommunications industry is constantly creating alternatives to travel for reaching a meeting forum. Teleconferencing has enabled many users to avoid long and expensive trips merely to meet with others to discuss business related topics and make important decisions. In addition, teleconferencing often replaces face to face meetings involving even the shortest of trips, such as those involving office locations relatively close in distance.

While teleconferencing typically offers good sound quality, attempting to send data over the same audio channel frequently disrupts the teleconference by diminishing the sound quality. Data, such as call control signals, can be sent via in-band signaling. However, conventional in-band signaling, such as DTMF, typically interrupts a call.

In order for participants to receive any type of data related to the call, meeting, etc. (e.g., exchanging information via electronic mail (E-mail)), items may be faxed or mailed prior to the call or the meeting. Unfortunately, these processes entail a significant delay between transmission and reception of the items. In order to avoid these delays, a second connection may be established during the teleconference. However, setting up this second connection often entails office personnel calling one another to exchange capabilities, numbers, passwords, and so forth, and alerting meeting participants when the connection is established and working. Disadvantageously, this type of communication can interrupt the teleconference in progress, be time consuming, and cause delays.

Further, attending to functions of devices associated with the meeting is often time consuming. For example, a participant utilizing a device associated with the meeting may adjust the device or program the device to accomplish a specified function, which causes interruptions to the ongoing teleconference and, accordingly, can cause delays to the meeting.

Therefore, it can be appreciated that there exists a need for a system and method for communication channel and device control via an existing audio channel. There is an additional need for a system and method for establishing additional communication channels via the existing audio channel.

SUMMARY OF THE INVENTION

The present invention provides in various embodiments a system and method for communication channel and device control via an existing audio channel. One example of communication channel control contemplated by the present invention is the establishment of additional communication channels (in addition to an existing audio communication channel) via the existing audio channel.

In a method according to one embodiment of the present invention, communication channel and device control via an existing audio channel is facilitated. Digital data comprising device control instructions is modulated onto a carrier signal. The modulated carrier signal is combined with an audio signal. The combined signal is then transmitted to one or more communication devices.

In another method according to one embodiment of the present invention, communication channel and device control via an existing audio channel is facilitated. A combined communication signal comprising an audio signal and a modulated carrier signal is received from a communication device via the audio channel. The audio signal is separated from the modulated carrier signal. Digital data is extracted from the modulated carrier signal. Then, device control is performed based on the extracted digital data.

In a system according to one embodiment of the present invention, communication channel and device control via an existing audio channel is facilitated. A communication interface receives a product signal from a communication device via the audio channel, the product signal comprising an audio signal and a modulated carrier signal. A product signal module coupled to the communication interface separates the audio signal from the modulated carrier signal. A demodulator extracts the digital data from the modulated carrier signal. Then, a data management engine coupled to the demodulator performs device control based on the extracted digital data.

A further understanding of the nature and advantages of the inventions herein may be realized by reference to the remaining portions of the specification and the attached drawings.

DESCRIPTION OF THE EXEMPLARY EMBODIMENTS

As shown in the exemplary drawings wherein like reference numerals indicate like or corresponding elements among the figures, embodiments of a system and method according to the present invention will now be described in detail. The following description sets forth an example of a system and method for identifying sourcing event metrics for analyzing a supplier.

Figure 1:
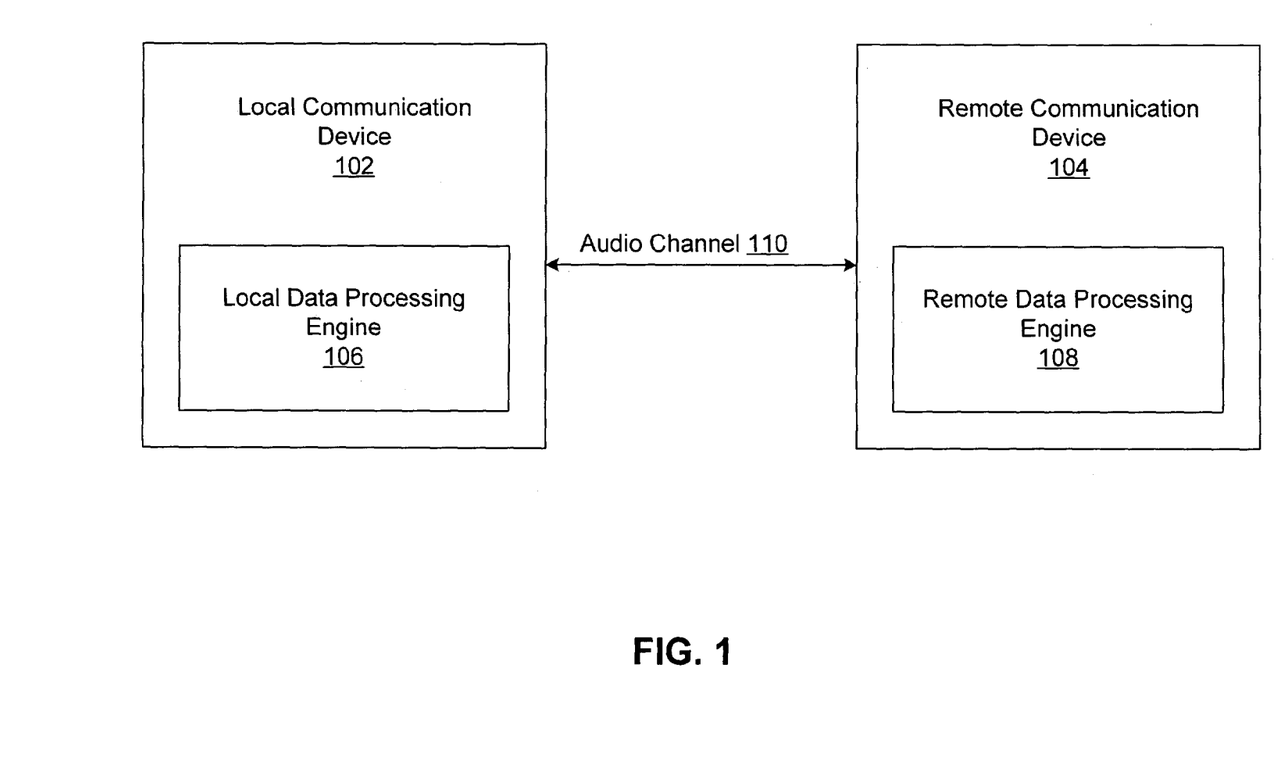
FIG. 1 is a schematic diagram illustrating an exemplary architecture for communicating audio signals including embedded digital data from a local communication device to a remote communication device.

Referring now to FIG. 1, a schematic diagram illustrating an exemplary architecture for communicating audio signals including embedded digital data from a local communication device 102 to a remote communication device 104 is shown. The local communication device 102 comprises a local data processing engine 106. Similarly, the remote communication device 104 comprises a remote data processing engine 108. Generally, the local data processing engine 106 prepares digital data for communication to the remote communication device 104 via an audio (communication) channel 110, such as a POTS line, a cable line, etc.

The remote data engine 108 processes the digital data received via the audio channel 110 and provides the data to a user of the remote communication device 104. The digital data communicated over the audio channel 110 is separate and distinct from the audio signals typically being communicated via the audio channel 110. Further, the digital data being communicated over the audio channel 110 does not interrupt an existing call, is not difficult to process, and is not detectable by call participants.

The local communication device 102 and/or the remote communication device 104 may be a conventional telephone, a digital telephone, a wireless telephone, a speakerphone, a videoconference device, etc. In one embodiment of the present invention, the local communication device 102 and the remote communication device 104 are equipped with modems for facilitating the transmission of encapsulated data over the POTS line.

FIG. 1 illustrates one exemplary architecture for communicating digital data in addition to the audio signals already being communicated via the audio channel 110 from the local communication device 102 to one or more remote communication devices 104. Various other architectures in accordance with the present invention are contemplated. As one example, other devices may be coupled to the local communication device 102 and/or the remote communication device 104, such as overhead projectors, cameras, printers, scanners, etc.

Further, by utilizing the audio channel 110 for both the audio signals and the digital data, the data being transmitted via the audio channel 110 is as secure as the audio channel 110 itself. Thus, the security of the data being transmitted via the audio channel 110 is jeopardized only if the audio channel 110 has been jeopardized. By this architecture, potential concerns related to the security of a separate data channel are alleviated since the data channel is part of the audio channel 110. Accordingly, security of the single audio channel between the local communication device 102 and the one or more remote communication devices 104 can be monitored, rather than monitoring the security of multiple channels from the local communication device 102 to the one or more remote communication devices 104. Consequently, the data communicated via the audio channel 110 can be confidential data such as a password.

Figure 2:
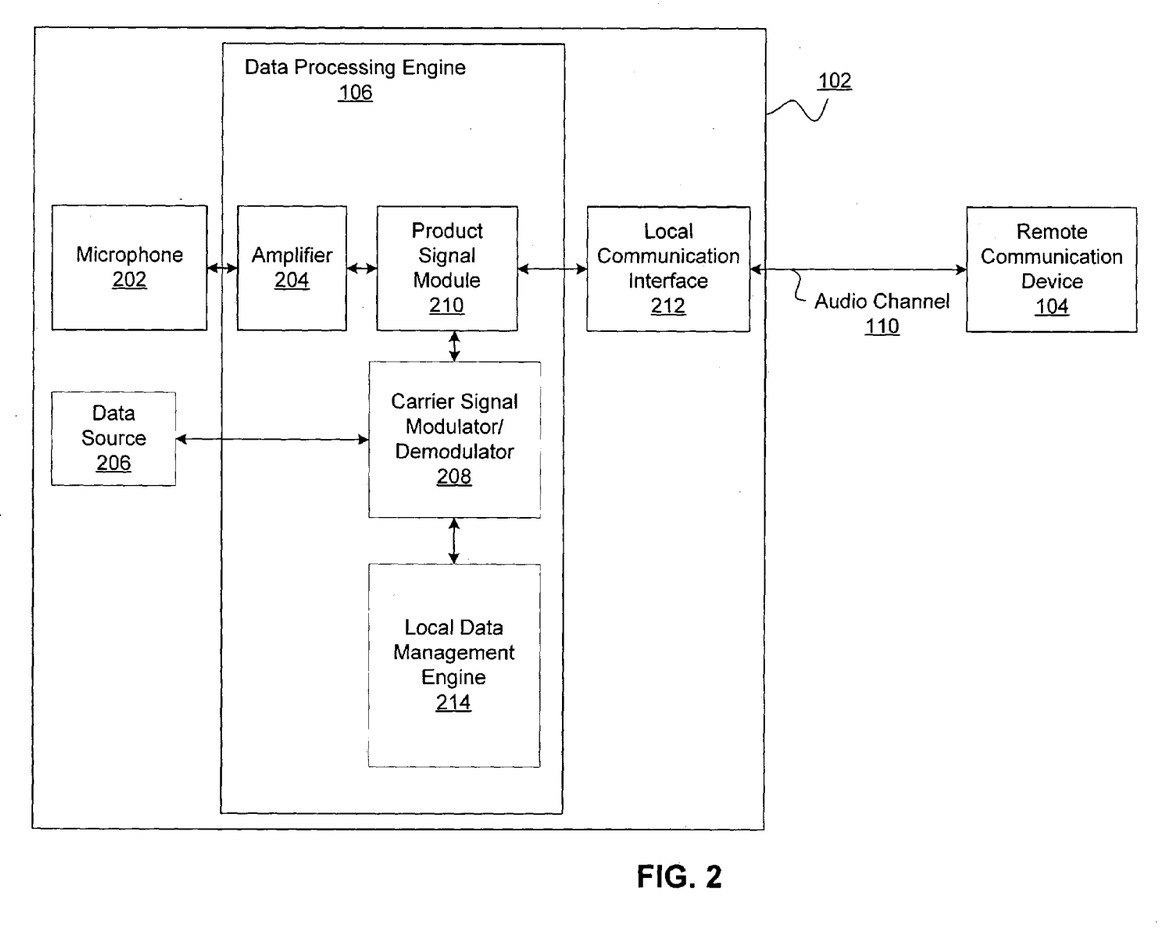
FIG. 2 is a schematic diagram illustrating an exemplary architecture for transmitting digital data over the existing audio channel via in-band signaling in accordance with the present invention.

Referring now to FIG. 2, a schematic diagram illustrating an exemplary architecture for providing digital data over the existing audio channel 110 via in-band signaling, in accordance with an embodiment of the present invention, is shown. As described in FIG. 1, the local communication device 102 exchanges audio signals via the audio channel 110 with the remote communication device 104. In order to send digital data in addition to the conventional audio signals over the same audio channel 110, a low data-rate data "connection" is embedded within an existing narrow-band connection. Utilizing this process, also referred to as low profile signaling protocol (LPSP), to transmit data during audio communication, various types of data aside from the conventional audio data can be exchanged by way of embedded digital data. For example, conference related data, such as spreadsheets or diagrams, can be exchanged between the local communication device 102 and the remote communication device 104.

Specifically, the local communication device 102 receives data, and prepares the data for transmission to the remote communication device 104 via the audio channel 110. A microphone 202 collects audio data and converts the audio data into an audio signal in the local communication device 102. The audio signal is then fed into an amplifier 204 for adjustment.

According to one embodiment, a portion of the audio signal may then be filtered out using a notch filter technique. In other words, the audio signal may be passed through a notch filter, which removes audio signal content in a spectral region where a modulated carrier signal will exist, as discussed herein. Thus, the notch filter creates a notch in the audio signal frequency spectrum for embedding the digital data.

In alternative embodiments, the notch filter creates multiple notches in the audio signal frequency spectrum. The remaining portion of the audio signal frequency spectrum is utilized for the transmission of conventional audio data. Typically, the sections of the audio signal frequency spectrum removed via the notch filter is as little as possible and at a higher end of the frequency spectrum typically inaudible to human ears. A carrier signal is then created and digital data is modulated onto the carrier signal to create the modulated carrier signal, which is subsequently embedded in the notch.

In an alternative embodiment, the audio signal is prepared in advance utilizing a spread spectrum module that modulates the digital data onto the carrier signal. The spread spectrum module varies the frequency of the carrier signal across the audio signal. Accordingly, the digital data is modulated onto the carrier signal, which is either spread across the audio signal utilizing the spread spectrum module or embedded into the audio signal in the notch of the audio signal created by the notch filter.

Alternatively, the audio signal may not require preparation. A direct-sequence spread spectrum signal can be added directly to the unprepared audio signal. Further, a frequency-hopping signal, for instance, may or may not require pre-notching of the audio signal at a hopping frequency. Thus, in some embodiments, the audio signal requires little or no preparation in order to be combined with the modulated carrier signal.

In either above-described embodiment, a data source 206 provides the digital data to be forwarded via the audio channel 110. The data source 206 may include any suitable source of data. For example, the data may be from an internal source, such as a source of data within a particular company, a 232 link, etc. For instance, an internal source of the data may be the data from a whiteboard, as discussed herein.

Next, a carrier signal generator generates a carrier signal. A carrier signal modulator/demodulator 208 then modulates the digital data from the data source 206 or control data from the local data management engine 214 onto the carrier signal, as discussed herein. The carrier signal modulator/demodulator 208 can also demodulate incoming modulated carrier signals received from the one or more remote communication devices 104, or any other device suitable for use with the present invention. In the present embodiment, the carrier signal is generated by the local communication device 102, however the carrier signal may be obtained from any suitable source. Further, any type of modulation suitable for use with the present invention may be employed, such as amplitude modulation, quadrature phase modulation, phase or differential phase modulation, and so on.

Subsequently, a product signal generator 210 creates a product signal comprising the audio signal combined with the modulated carrier signal. The modulated carrier signal is typically added to the audio signal at a very low amplitude. Low amplitude can be accomplished by pre-notching the audio signal at the modulated carrier signal frequency, as discussed herein. Resultantly, the modulated carrier signal has a low amplitude relative to audio amplitudes surrounding the modulated carrier signal amplitude, making the modulated carrier signal amplitude undetectable by a human ear. Accordingly, the modulated carrier signal is inaudible to, or "masked" from, the ordinary listener. Further, sounds that are in a spectral proximity to a target signal typically render the target signal inaudible. Thus, the modulated carrier signal (i.e., target signal) is masked by the audio signal (i.e., sounds) in which the modulated carrier signal is embedded.

In one embodiment, the modulated carrier signal is modulated toward the upper end of the bandwidth spectrum, such as 3 kHz. Because the ear is less sensitive to signals at this end of the spectrum, the modulated carrier signal is inaudible to the ordinary listener. Further, the modulated carrier signal has a narrow bandwidth, as discussed herein, which allows the notching of the audio signal to be correspondingly narrow, and to thus have no perceptible effect on the audio signal.

A local communication interface 212 forwards the product signal to one or more remote communication devices 104 via the audio channel 110. Any suitable transmission medium may be employed for communicating the product signal to the one or more remote communication devices 104.

Because the carrier signal is added to the audio signal utilizing the notch filter technique or the spread spectrum technique described herein, users of a phone line experience no call interruption, as previously discussed. Accordingly, users can exchange data in addition to the normal audio signal data being carried over the phone line without experiencing any noticeable call interruption and without having to establish multiple communication channels. It is understood that this is merely one example of the use of the present invention. Other devices may be utilized to communicate other types of data. For example, overhead projectors, computers, video cameras, etc. may be utilized to communicate data via the carrier signal.

As discussed herein, the carrier signal modulator/demodulator 208 can also demodulate incoming modulated carrier signals. Once the digital data has been extracted from the incoming modulated carrier signal by the carrier signal modulator/demodulator 208, the digital data is forwarded to a local data management engine 214. An exemplary embodiment of a remote data management engine 314, which is similar to the local data management engine 214, will be discussed in more detail in FIG. 4. Although the local communication device 102 perspective is utilized for discussion purposes, the one or more remote communication devices 104 are capable of performing identical or similar functions, due to the bidirectional nature of communication, in accordance with the present invention.

Finally, a local communication interface 212 forwards the product signal to one or more communication devices 104 via the audio channel 110. Any suitable transmission medium may be employed for communicating the product signal to the one or more remote communication devices 104.

Upon receipt of the product signal by a communication interface at the remote communication device 104, the audio signal is separated from the modulated carrier signal. The modulated carrier signal is forwarded to a remote data management engine, which processes the data from the modulated carrier signal.

Figure 3:
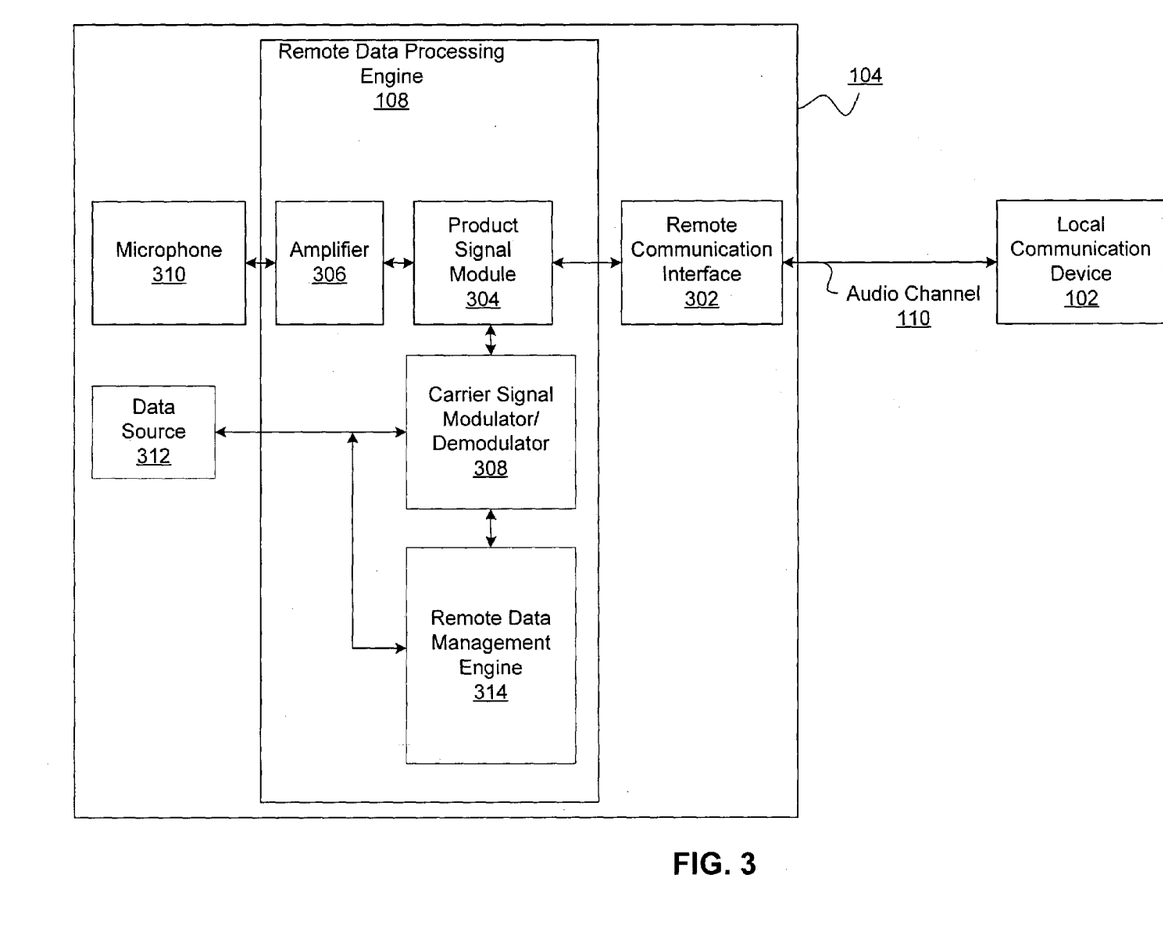
FIG. 3 is a schematic diagram illustrating an exemplary remote communication device in accordance with the present invention.

Referring now to FIG. 3, a schematic diagram illustrating an exemplary remote communication device 104 is shown. The audio signal with the modulated carrier signal is received by the one or more remote communication devices 104 via a remote communication interface 302. The remote data processing engine 108 at the remote communication device 104 recovers the product signal and the product signal module 304 separates the audio signal from the modulated carrier signal. The audio signal is typically amplified by the amplifier 306 and played via a speaker (not shown) associated with the remote communication device 104. The carrier signal is demodulated by the carrier signal modulator/demodulator 308 and the digital data is typically displayed via a display medium (not shown) associated with the remote communication device 104, utilized by the remote communication device 104, etc.

Once the digital data is recovered by the carrier signal modulator/demodulator 308, the digital data is forwarded to a remote data management engine 314. As discussed herein, the remote data management engine 314 can control functions, devices, etc. associated with an audio conference occurring via the audio channel 110, in response to the control data received. For instance, the remote data management engine 314 may instruct other devices participating in the audio conference, or itself, to adjust volume, request hang-up status, request participant polling data, etc. Other devices participating in the conference may include, for instance, other communication devices, an audio bridge, a video device, a multimedia conference bridge, projectors, the network itself, etc.

Because communication is bidirectional, the remote communication device 104 can forward digital data to the local communication device 102 and/or other devices by modulating digital data from a data source 306 onto a carrier signal via the carrier signal modulator/demodulator 308. The product signal module 304 combines the modulated carrier signal with the audio signal received via the microphone 302 and amplified via the amplifier 306. The product signal is then forwarded to the local communication device 102 and/or any other device via the audio channel 110. Alternatively, the digital data, audio signal, and/or product signal can be forwarded to the local communication device 102 and/or any other device via one or more new communication channels established by the communication channel generator 306 at the local communication device 102 or a communication channel generator (not shown) at the remote communication device 104.

Figure 4:
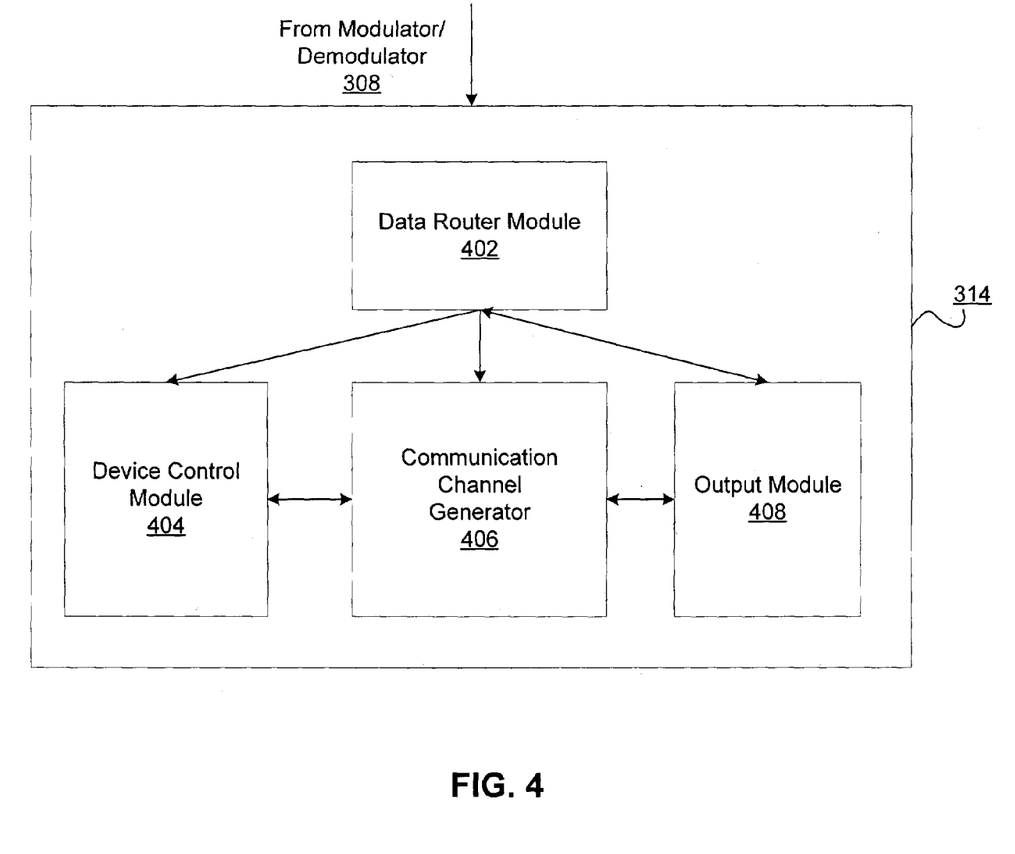
FIG. 4 is a schematic diagram illustrating an exemplary remote data management engine in accordance with the present invention.

Referring now to FIG. 4, a schematic diagram illustrating an exemplary remote data management engine 314 is shown. The remote data management engine 314 includes a data router module 402, a device control module 404, a communication channel generator 406, and an output module 408. Upon receipt of the product signal, the carrier signal modulator/demodulator 308 extracts the digital data from the modulated carrier signal and forwards the digital data to the remote data management engine 314, as discussed herein.

The data router module 402 examines the digital data and determines whether to forward the data to the device control module 404, the communication channel generator 406, and/or the output module 408. The data router module 402 may make the determination based on the content of the digital data, itself, a header associated with the digital data, etc. The data router module 402 forwards the data to one or more of the appropriate modules (404, 406, and/or 408) based on the nature of the data. For instance, data that does not require any further action to be taken in response to the data itself, other than display of the data, may only be forwarded to the output module.

The device control module 404 creates instructions based on the data received from the data router module 402. The instructions generated by the device control module 404 can translate the data into control commands in order to control one or more devices associated with the remote communication device 104 and/or the remote communication device 104, itself. For instance, the device control module 404 may instruct, via a control command, one or more devices to adjust volume. Any control command or other instruction for controlling any device associated with the remote communication device 104 and/or any other device associated with the audio channel 110 is within the scope of the present invention. The device control module 404 can also forward the digital data, control commands, instructions, feedback, etc. to the data router module 402, the communication channel generator 406, and/or the output module 408 for further processing.

The communication channel generator 406 creates at least one new communication channel in response to the data received from the data router module 402, the device control module 404, and/or the output module 408. Alternatively, the communication channel generator 406 can send information pertinent to establishing the at least one new communication channel to the remote communication device 104, itself, the local communication device 102, and/or another device associated with the existing audio channel 110. For instance, the communication channel generator 406 can provide a meeting location, session identification, password, etc. that enables the at least one new communication channel to be successfully opened and data to be exchanged over the new communication channel.

As discussed herein, the data communicated via the audio channel 110 is as secure as the audio channel 110 itself. Thus, unless the security of the audio channel 110 has been breached in some manner, the data provided via the audio channel, such as a password, is protected.

The output module 408 determines an output medium for the data received via the data router module 402, the device control module 404, and/or the communication channel generator 406. The output module 408 may output the data via any medium suitable for use with the present invention. For instance, the data may be output via a screen, such as an LCD screen associated with a telephone, a computer screen, etc., associated with the local communication device 102, the remote communication device 104, and/or any other device associated with the existing audio channel 110. As another example, the data may be output via a speaker associated with the local communication device 102, the remote communication device 104, and/or any other device associated with the existing audio channel 110. Any method of outputting the data is within the scope of the present invention.

Figure 5:
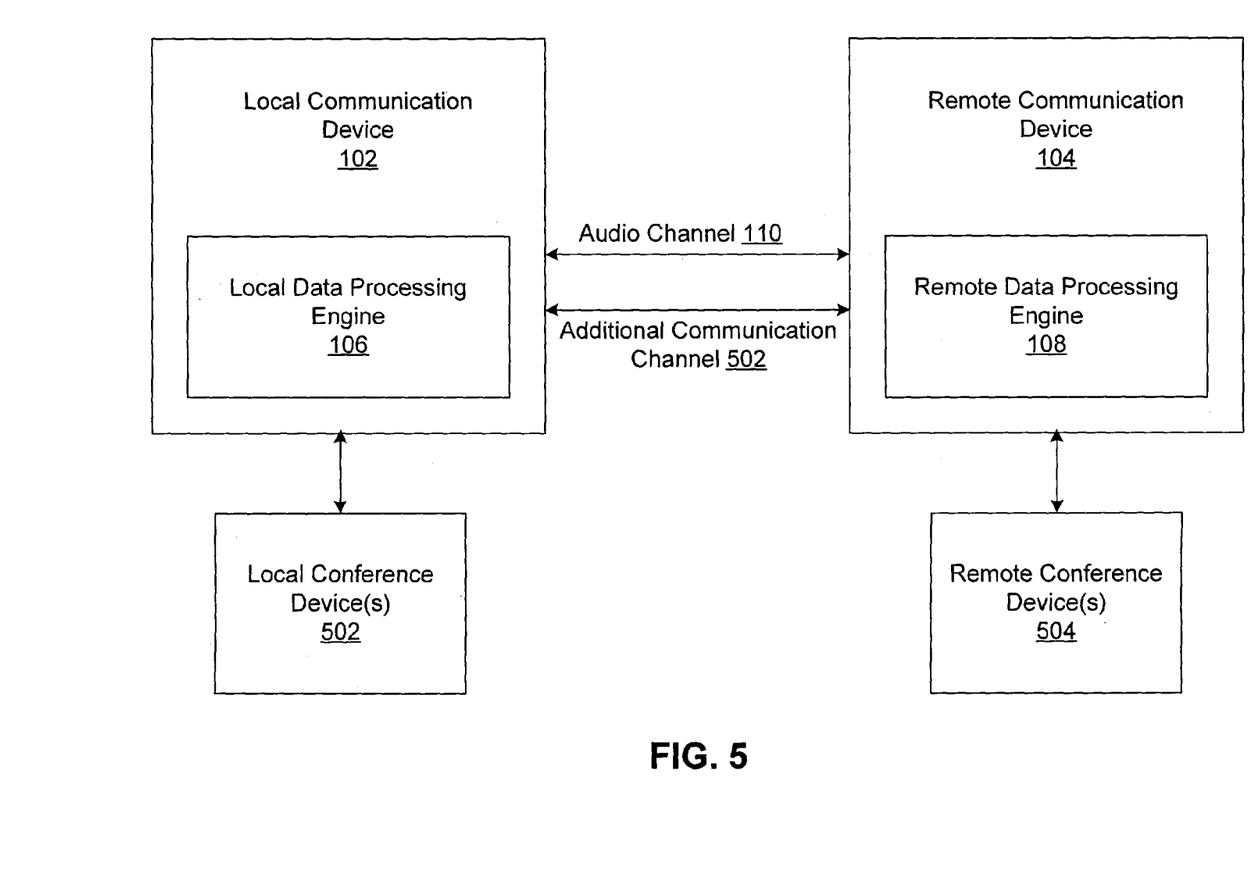
FIG. 5 is a flowchart of an exemplary process for establishing and controlling additional communication channels and devices from within an existing audio channel in accordance with the present invention.

Referring now to FIG. 5, a schematic diagram illustrating an additional communication channel 502 as well as one or more local conference devices 504 and/or one or more remote conference devices 506 associated with the local communication device 102 and the remote communication device 104, respectively, in accordance with an embodiment of the present invention is shown. The audio channel 110 communicates audio signals between the local communication device 102 and the remote communication device 104. As discussed herein, the local data processing engine 106 and the remote processing engine 108 also embeds digital signals in the audio signal transferred via the audio channel 110. Advantageously, the digital signals do not interrupt the audio signal transmission via the audio channel 110. Further, the audio channel 110 is utilized for the transmission of digital data in addition to the ongoing audio data being transmitted via the audio (communication) channel 110.

Both the local data processing engine 106 at the local communication device 102 or the remote data processing engine 108 at the remote communication device 104 can establish the new communication channel 502 based on the digital data received via the audio channel 110. Although the new communication channel 502 shown in FIG. 5 is established between the local communication device 102 and the remote communication device 104, the additional communication channel 502 can be established between any devices associated with the existing audio channel 110, the local communication device 102, the remote communication device 104, and/or any device. For instance, a video device can establish the new communication channel 502 with a display device according to instructions received from the communication channel generator 306. Further, as discussed herein, more than one new communication channel 502 may be established between the local communication device 102, the one or more remote communication devices 104, and/or any other devices.

As previously discussed, the audio channel 110 can be utilized to transmit confidential data. For instance, the audio channel 110 may be utilized to initiate a secure new communication channel 502. In this embodiment, an encrypted key, for instance, may be forwarded to the one or more remote communication devices 104 via the audio channel 110. The encrypted key may then be utilized to decrypt data received by the one or more remote communication devices 104 via the audio channel 110 or over any other communication channel.

The new communication channel 502 can be transmitted over a medium similar to that of the audio channel 110 or over a medium separate from that utilized by the audio channel 110. Further, the new communication channel 502 can be an audio channel, a video channel, a graphics channel, etc. The additional communication channel 502 may utilize a POTS line, an ISDN line, an IP connection, a radio connection, etc.

One or more local conference devices 504 may be associated with the local communication device 102. Similarly, one or more remote conference devices 506 may be associated with the remote communication device 104. The local conference device(s) 504 and the remote conference device(s) 506 may include, for example, projectors, computing devices, bridges, etc. The local communication device 102 and the remote communication device 104 can control the local conference device(s) 504 and the remote conference device(s) 506, respectively, based on the digital data received via the audio channel 110 as well as data received via the new communication channel 502.

For example, a participant associated with the local communication device 102 connects a computer video port (i.e., local conference device(s) 504) to the local communication device 102. The local communication device 102 detects the presence of the computer video port and the local data processing engine 106 creates an instruction to establish an IP connection to the remote communication device 104 as a new communication channel 502. The instruction is forwarded to the remote communication device 104 via the audio channel 110, the instruction including meeting location, session identification, and password data embedded into the audio signal already being communicated via the audio channel 110.

The remote communication device 104 receives the audio signal including the embedded digital data modulated onto a carrier signal and extracts the digital data from the audio signal. The remote communication device 104 accesses the meeting location site, enters the session identification and password, and begins receiving data. Accordingly, the new communication channel 502 is established. The local communication device 102 and the remote communication device 104, as well as any other devices provided with the data via the audio channel 110 can continue to exchange data via the new communication channel 502 established.

As another example, the participant associated with the local communication device 102 may forward a signal to the remote communication device 104 via the audio channel to establish a radio connection as the new communication channel 502 including instructions, such as "1296.551 MHz using lower sideband modulation, originating from 120.32 North by 34.55 East." The remote communication device 104 receives the audio signal and extracts the digital data from the audio signal. Subsequently, the management engine 304 (FIG. 3) at the remote communication device 104 generates a control signal to program a coupled radio (i.e., remote conference device(s) 406) to this frequency, modulation type, and antenna orientation. Similarly, a management engine (not shown) at the local communication device 102 instructs a radio and antenna associated with the local communication device 102 to proceed to the same frequency, using the same modulation type, and antenna orientation. Any use of the new communication channel 502 and controlling functions of the local conference device(s) 504 and/or the remote conference device(s) 506 is within the scope of the invention.

Figure 6:
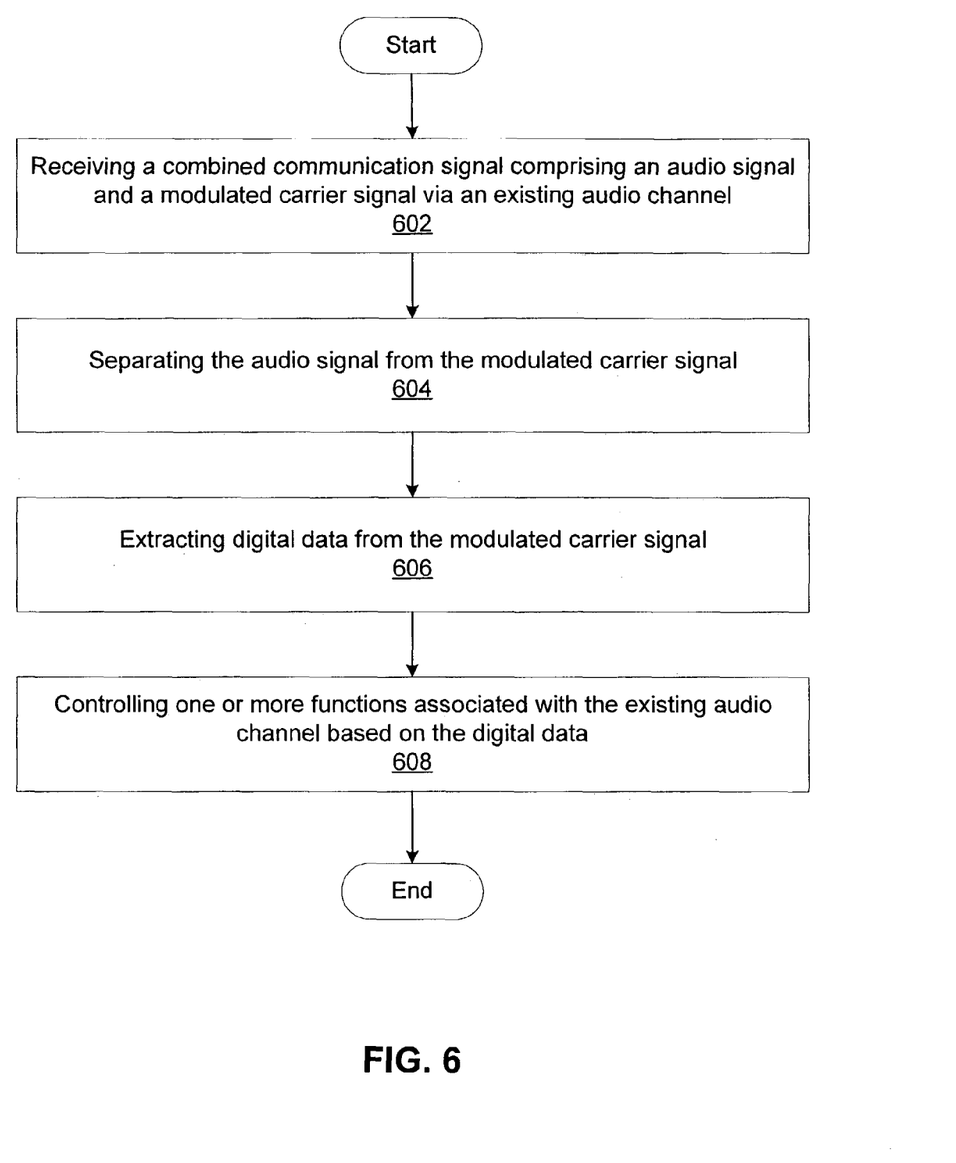
FIG. 6 is a flowchart of an exemplary process for establishing and controlling additional communication channels and devices using an existing audio channel.

Referring now to FIG. 6, an exemplary process for establishing and controlling additional communication channels and devices using an existing audio channel is shown. Although this process is described from the perspective of the local communication device 102 transmitting data to the remote communication device 104, the local communication device 102 and the one or more remote communication devices 104 can perform the processes discussed herein as is suitable for bidirectional communication.

At step 602, a combined communication signal (i.e. product signal) comprising an audio signal and a modulated carrier signal is received via the audio channel 110. As discussed herein, digital data is modulated onto a carrier signal by a carrier signal modulator/demodulator 208 and the carrier signal is added to the audio signal by the product signal module 210. Any modulation technique for modulating the digital data onto the carrier signal is within the scope of the invention.

At step 604, the audio signal is separated from the carrier signal at the remote communication device 104. Typically, the remote data processing engine 314 separates the modulated carrier signal from the audio signal. At step 606, the carrier signal modulator/demodulator 408 extracts the digital data from the carrier signal.

At step 608, the remote data processing engine 314 controls one or more devices associated with the existing audio channel 110 based on control data extracted from the received modulated carrier signal. As discussed herein, the control data may include instructions to a device associated with the local communication device 102 and/or the remote communication device 104 to perform an activity, such as adjusting volume, and/or the function may include establishing an new communication channel 502.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for controlling a communication channel or a connected conference device via an audio channel, comprising:
    receiving an audio signal;
    receiving control data, wherein the control data is to control the communication channel or the connected conference device;
    modulating the control data onto an audio carrier signal;
    combining the modulated audio carrier signal and the audio signal to form a new audio signal, wherein the modulated carrier signal is embedded in the audio signal at a very low amplitude, making the modulated carrier signal amplitude undetectable by a human ear; and
    sending the new audio signal to the connected conference device via the audio channel wherein the control data includes a command to establishing a new communication channel in addition to the audio channel.

2. The method of claim 1, wherein the communications channel is an IP connection.

3. The method of claim 1, wherein the communications channel is established with a multimedia conference bridge.

4. The method of claim 1, wherein the audio channel is a POTS connection.

5. The method of claim 1, wherein the control data include commands to manipulate one or more functionalities of the connected conference device.

6. The method of claim 1, wherein the control data include commands to manipulate one or more functionalities of a second device coupled to the connected conference device.

7. The method of claim 1, further comprising:
    receiving the new audio signal by the connected conference device via the audio channel;
    separating the audio signal and the modulated audio carrier signal from the new audio signal;
    demodulating the modulated audio carrier signal to extract the control data; and
    performing a device control function or a communication channel control function indicated by the control data at the connected conference device.

8. A method for controlling a communication channel or a conference device via an audio channel by a remote conference device, comprising:
    receiving an audio signal via the audio channel from the remote conference device, wherein the audio signal contains a modulated audio carrier signal and another audio signal, wherein the modulated audio carrier signal is embedded in the audio signal at a very low amplitude, making the modulated carrier signal amplitude undetectable by a human ear before being separated from the audio signal;
    separating the audio signal into the other audio signal and the modulated audio carrier signal;
    demodulating the audio carrier signal and extract digital data, wherein the digital data includes a command to control a device function;
    performing the device control function indicated by the control data; and
    producing sound of the other audio signal through a loudspeaker, wherein the device control function is to establish a new communication channel in addition to the audio channel.

9. The method of claim 8, wherein the communications channel is an IP connection.

10. The method of claim 8, wherein the communications channel is established with a multimedia conference bridge.

11. The method of claim 8, wherein the audio channel is a POTS connection.

12. The method of claim 8, wherein another local conference device is coupled to the conference device, the method further comprising:
- manipulating one or more functionalities of the other local conference device as indicated by the control data.

13. A conference device for controlling a communication channel or a connected far end conference device via an audio channel, the conference device comprising:
- a microphone to generate an audio signal;
- an interface to couple with the far end conference device via the audio channel; and
- a processing module coupled to the microphone and the interface;
- wherein the processing module is operable to,
  - issue control data which is a command to control a functionality of the far end conference device;
  - receive the audio signal from the microphone;
  - modulate the control data onto an audio carrier signal;
  - combine the modulated audio carrier signal and the audio signal to form a new audio signal, wherein the modulated carrier signal is embedded in the audio signal at a very low amplitude, making the modulated carrier signal amplitude undetectable by a human ear; and
  - send the new audio signal to the connected far end conference device via the audio channel, wherein the control data includes a command to establishing a new communication channel in addition to the audio channel.

14. The conference device of claim 13, wherein the communications channel is an IP connection.

15. The conference device of claim 13, wherein the communications channel is established with a multimedia conference bridge.

16. The conference device of claim 13, wherein the audio channel is a POTS connection.

17. The conference device of claim 13, wherein the control data include commands to manipulate one or more functionalities of the connected device.

18. The conference device of claim 13, wherein the control data include commands to manipulate one or more functionalities of a second device coupled to the connected device.

19. A conference device operable to be controlled by a remote conference device connected via an audio channel, the conference device comprising:
- a loudspeaker;
- an interface to couple with the far end conference device via the audio channel; and
- a processing module coupled to the loudspeaker and the interface,
- wherein the processing module is operable to,
  - receive an audio signal via the audio channel from the remote conference device, wherein the audio signal contains a modulated audio carrier signal and another audio signal, wherein the modulated audio carrier signal is embedded in the audio signal at a very low amplitude, making the modulated carrier signal amplitude undetectable by a human ear before being separated from the audio signal;
  - separate the audio signal into the other audio signal and a modulated audio carrier signal;
  - demodulate the audio carrier signal and extract digital data, wherein the digital data includes commands to control device functions;
  - perform a device control function indicated by the control data; and
  - send the other audio signal to a loudspeaker, wherein the device control function is to establish a new communication channel in addition to the audio channel.

20. The conference device of claim 19, wherein the communications channel is an IP connection.

21. The conference device of claim 19, wherein the communications channel is established with a multimedia conference bridge.

22. The conference device of claim 19, wherein the audio channel is a POTS connection.

23. The conference device of claim 19, wherein another local device is coupled to the conference device, the processing module is further operable to:
- manipulate one or more functionalities of the other local device as indicated by the control data.

24. A conference system for controlling one conference device by another via an audio channel, the conference system comprising:
- a local conference device includes:
  - a microphone to generate an audio signal;
  - an interface; and
  - a processing module coupled to the microphone and the interface; and
- a remote conference device includes:
  - a loudspeaker;
  - an interface; and
  - a processing module coupled to the loudspeaker and the interface,
- wherein the interfaces of the local conference device and the remote device are connected through an audio channel;
- wherein the processing module in the local conference device is operable to,
  - issue control data which is a command to control a functionality of the remote conference device;
  - receive the audio signal from the microphone;
  - modulate the control data onto an audio carrier signal;
  - combine the modulated audio carrier signal and the audio signal to form a new audio signal, wherein the modulated carrier signal is embedded in the audio signal at a very low amplitude, making the modulated carrier signal amplitude undetectable by a human ear;
  - send the new audio signal to the connected far end conference device via the audio channel; and
- wherein the processing module in the remote conference device is operable to,
  - receive the new audio signal via the audio channel;
  - separate the new audio signal into the audio signal and the modulated audio carrier signal;
  - demodulate the audio carrier signal and extract digital data;
  - perform a device control function indicated by the control data; and
  - send the audio signal to the loudspeaker, wherein the device control function is to establish a new communication channel in addition to the audio channel.

25. The conference system of claim 24, wherein the communications channel is an IP connection.

26. The conference system of claim 24, wherein the communications channel is established with a multimedia conference bridge.

27. The conference system of claim 24, wherein the audio channel is a POTS connection.

28. The conference system of claim 24, further comprising:
a second remote conference device coupled to the remote conference device,
wherein the remote conference device is operable to manipulate one or more functionalities of the second remote conference device as indicated by the control data.

29. A method for controlling a communication channel or a connected conference device via an audio channel, comprising:
receiving an audio signal;
receiving control data, wherein the control data is to control the communication channel or the connected conference device;
modulating the control data onto an audio carrier signal;
combining the modulated audio carrier signal and the audio signal to form a new audio signal, wherein the modulated carrier signal is embedded in the audio signal at a very low amplitude, making the modulated carrier signal amplitude undetectable by a human ear; and
sending the new audio signal to the connected conference device via the audio channel wherein the control data includes a command to establishing a new communication channel in addition to the audio channel.

30. The method of claim 29, wherein the communications channel is an IP connection.

31. The method of claim 29, wherein the communications channel is established with a multimedia conference bridge.

32. The method of claim 29, wherein the audio channel is a POTS connection.

33. The method of claim 29, wherein the control data include commands to manipulate one or more functionalities of the connected conference device.

34. The method of claim 29, wherein the control data include commands to manipulate one or more functionalities of a second device coupled to the connected conference device.

35. The method of claim 29, further comprising:
receiving the new audio signal by the connected conference device via the audio channel;
separating the audio signal and the modulated audio carrier signal from the new audio signal;
demodulating the modulated audio carrier signal to extract the control data; and
performing a device control function or a communication channel control function indicated by the control data at the connected conference device.

36. A conference device for controlling a communication channel or a connected far end conference device via an audio channel, the conference device comprising:
a microphone to generate an audio signal;
an interface to couple with the far end conference device via the audio channel; and
a processing module coupled to the microphone and the interface;
wherein the processing module is operable to,
issue control data which is a command to control a functionality of the far end conference device;
receive the audio signal from the microphone;
modulate the control data onto an audio carrier signal;
combine the modulated audio carrier signal and the audio signal to form a new audio signal, wherein the modulated carrier signal is embedded in the audio signal at a very low amplitude, making the modulated carrier signal amplitude undetectable by a human ear; and
send the new audio signal to the connected far end conference device via the audio channel, wherein the control data includes a command to establishing a new communication channel in addition to the audio channel.

37. The conference device of claim 36, wherein the communications channel is an IP connection.

38. The conference device of claim 36, wherein the communications channel is established with a multimedia conference bridge.

39. The conference device of claim 36, wherein the audio channel is a POTS connection.

40. The conference device of claim 36, wherein the control data include commands to manipulate one or more functionalities of the connected device.

41. The conference device of claim 36, wherein the control data include commands to manipulate one or more functionalities of a second device coupled to the connected device.

* * * * *